(12) United States Patent
Sambongi

(10) Patent No.: US 9,386,207 B2
(45) Date of Patent: Jul. 5, 2016

(54) IMAGE-CAPTURING APPARATUS

(71) Applicant: OLYMPUS CORPORATION, Shibuya-ku, Tokyo (JP)

(72) Inventor: Masao Sambongi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/730,554

(22) Filed: Jun. 4, 2015

(65) Prior Publication Data

US 2015/0271373 A1    Sep. 24, 2015

Related U.S. Application Data

(63) Continuation of application No. PCT/JP2014/050686, filed on Jan. 16, 2014.

(30) Foreign Application Priority Data

Feb. 14, 2013    (JP) .................................. 2013-026596

(51) Int. Cl.
*H04N 5/225*    (2006.01)
*G02B 3/00*    (2006.01)
*G01C 3/06*    (2006.01)
(Continued)

(52) U.S. Cl.
CPC ................ *H04N 5/2254* (2013.01); *G01C 3/06* (2013.01); *G02B 3/0037* (2013.01); *G02B 7/28* (2013.01); *G03B 9/04* (2013.01); *G03B 13/36* (2013.01);
(Continued)

(58) Field of Classification Search
CPC ....................................................... G02B 5/005

USPC .............................. 348/222.1, 340, 364, 374
See application file for complete search history.

(56) References Cited

U.S. PATENT DOCUMENTS 7,671,321 B2    3/2010    Perlman et al.
7,936,392 B2    5/2011    Ng et al.
(Continued)

FOREIGN PATENT DOCUMENTS

JP    63252215 A    10/1988
JP    07281080 A    10/1995
(Continued)

OTHER PUBLICATIONS

International Search Report (ISR) dated Mar. 11, 2014 issued in International Application No. PCT/JP2014/050686.
(Continued)

*Primary Examiner* — Joel Fosselman
(74) *Attorney, Agent, or Firm* — Holtz, Holtz & Volek PC

(57) ABSTRACT

It is possible to obtain the distance to an object with high precision, and it is also possible to obtain a high-quality image. Provided is an image-capturing apparatus including an image-capturing lens that focuses light from a subject; an aperture member disposed adjacent to the image-capturing lens; an image-capturing device that captures an image of the light focused by the image-capturing lens and passing through the aperture member; and a microlens array disposed between the image-capturing device and the image-capturing lens, with gaps therebetween in an optical-axis direction, wherein the aperture member includes at least one normal aperture portion having a substantially circular opening and at least two coded aperture portions having openings in a prescribed pattern.

5 Claims, 9 Drawing Sheets

(51) Int. Cl.
*G03B 9/04* (2006.01)
*G03B 13/36* (2006.01)
*G02B 7/28* (2006.01)
*G02B 5/00* (2006.01)

(52) U.S. Cl.
CPC .............. *G02B 3/0056* (2013.01); *G02B 5/005* (2013.01); *G02B 2207/129* (2013.01)

(56) References Cited

U.S. PATENT DOCUMENTS

| | | | |
|---|---|---|---|
| 7,962,033 | B2 | 6/2011 | Georgiev et al. |
| 8,013,285 | B2 | 9/2011 | Perlman et al. |
| 8,288,704 | B2 | 10/2012 | Perlman et al. |
| 8,358,367 | B2 | 1/2013 | Ng et al. |
| 8,395,696 | B2 | 3/2013 | Ng et al. |
| 8,547,475 | B2 | 10/2013 | Ng et al. |
| 8,648,958 | B2 | 2/2014 | Ng et al. |
| 8,698,944 | B2 | 4/2014 | Ng et al. |
| 8,717,489 | B2 | 5/2014 | Ng et al. |
| 8,866,957 | B2 | 10/2014 | Ng et al. |
| 8,953,064 | B1 | 2/2015 | Ng et al. |
| 2008/0239316 | A1* | 10/2008 | Gharib .................. G01B 11/24 356/364 |
| 2010/0066854 | A1* | 3/2010 | Mather .................. G02B 5/005 344/222.1 |
| 2014/0204184 | A1 | | 7/2014 Ng et al. |

FOREIGN PATENT DOCUMENTS

| | | |
|---|---|---|
| JP | 2008527944 A | 7/2008 |
| JP | 2009168995 A | 7/2009 |
| JP | 2010039107 A | 2/2010 |
| JP | 4752031 B2 | 8/2011 |
| JP | 2012088169 A | 5/2012 |
| JP | 2012127700 A | 7/2012 |
| WO | 2006039486 A2 | 4/2006 |
| WO | 2006078537 A2 | 7/2006 |

OTHER PUBLICATIONS

Ng, et al., "Light Field Photography with a Hand-held Plenoptic Camera", Stanford Tech. Report CTSR Feb. 2005, pp. 1-11.

\* cited by examiner

9,386,207 B2

IMAGE-CAPTURING APPARATUS

CROSS-REFERENCE TO RELATED APPLICATIONS

This is a continuation of International Application PCT/JP2014/050686 which is hereby incorporated by reference herein in its entirety.

This application is based on Japanese Patent Application No. 2013-026596, the contents of which are incorporated herein by reference.

TECHNICAL FIELD

The present invention relates to an image-capturing apparatus.

BACKGROUND ART

In the related art, an image-capturing apparatus that uses a microlens array has been proposed (for example, see Patent Literature 1).

This image-capturing apparatus includes, between an image-capturing lens and a sensor, a microlens array in which a plurality of pixels are assigned to each lens. With this image-capturing apparatus, it is possible to simultaneously obtain a plurality of parallax images, and by performing known stereo-matching processing, it is possible to measure the distance to a subject at every point on the subject.

CITATION LIST

Patent Literature

{PTL 1}
The Publication of Japanese Patent No. 4752031

SUMMARY OF INVENTION

Solution to Problem

In one aspect of the present invention, there is provided an image-capturing apparatus including an image-capturing lens that focuses light from a subject; an aperture member disposed adjacent to the image-capturing lens; an image-capturing device that captures an image of the light focused by the image-capturing lens and passing through the aperture member; and a microlens array disposed between the image-capturing device and the image-capturing lens, with gaps therebetween in an optical-axis direction, wherein the aperture member includes at least one normal aperture portion having a substantially circular opening and at least two coded aperture portions having openings in a prescribed pattern.

DESCRIPTION OF EMBODIMENT

An image-capturing apparatus 1 according to an embodiment of the present invention will be described below with reference to the drawings.

Figure 1:
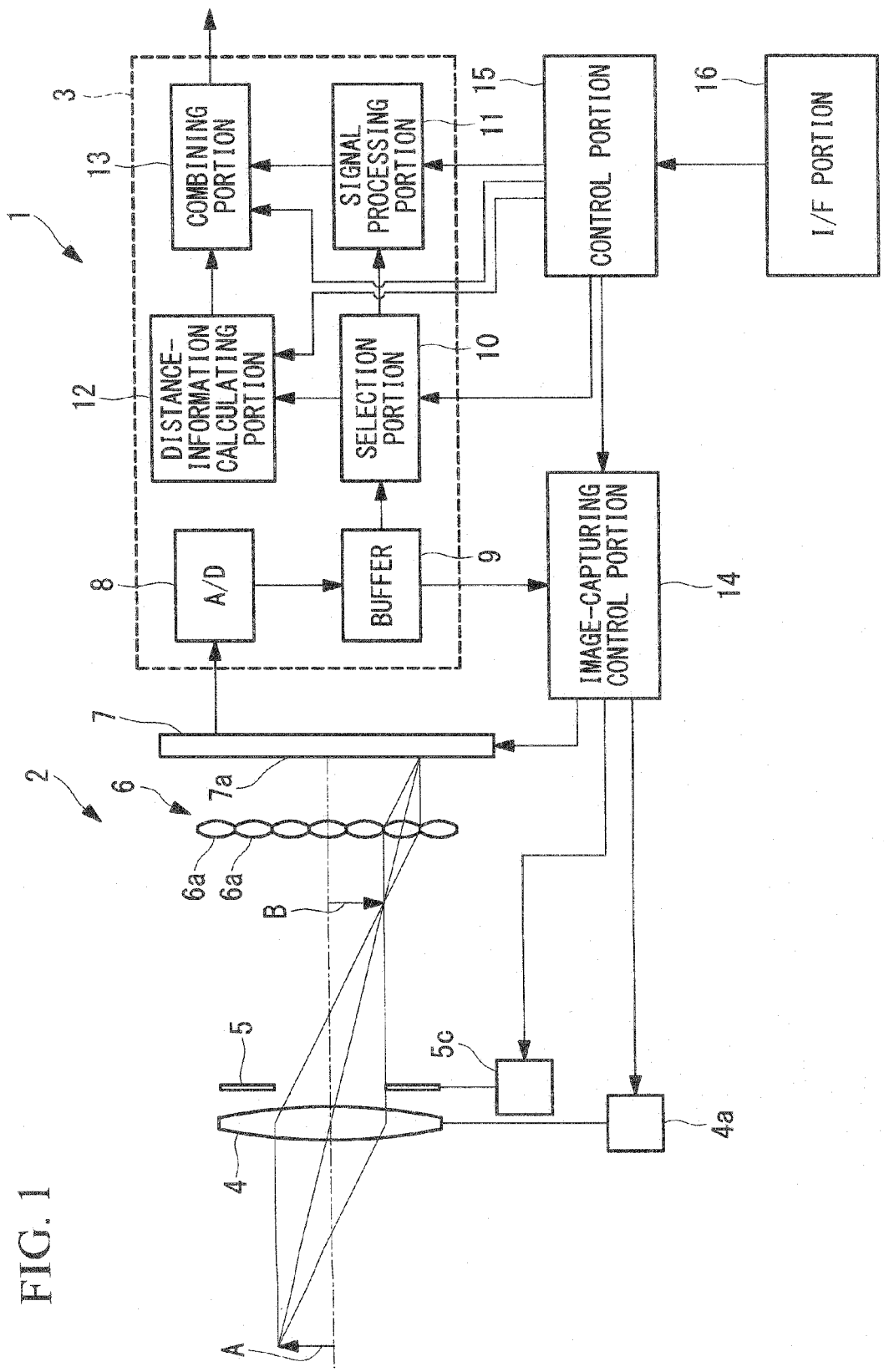
FIG. 1 is a block diagram showing an image-capturing apparatus according to an embodiment of the present invention.

As shown in FIG. 1, the image-capturing apparatus 1 according to this embodiment includes an image-capturing portion 2 that captures an image of a subject A and obtains image information, and an image processing portion 3 that processes the image information obtained by the image-capturing portion 2.

As shown in FIG. 1, the image capturing portion 2 includes an image-capturing lens 4 that focuses light coming from a subject A, an aperture member 5 disposed adjacent to the image-capturing lens 4, a microlens array 6 on which the light that has passed through the aperture member 5 and has formed a real image B is incident, and an image-capturing device 7 that is disposed at an image-forming position of individual microlenses 6a in the microlens array 6.

Figure 2:
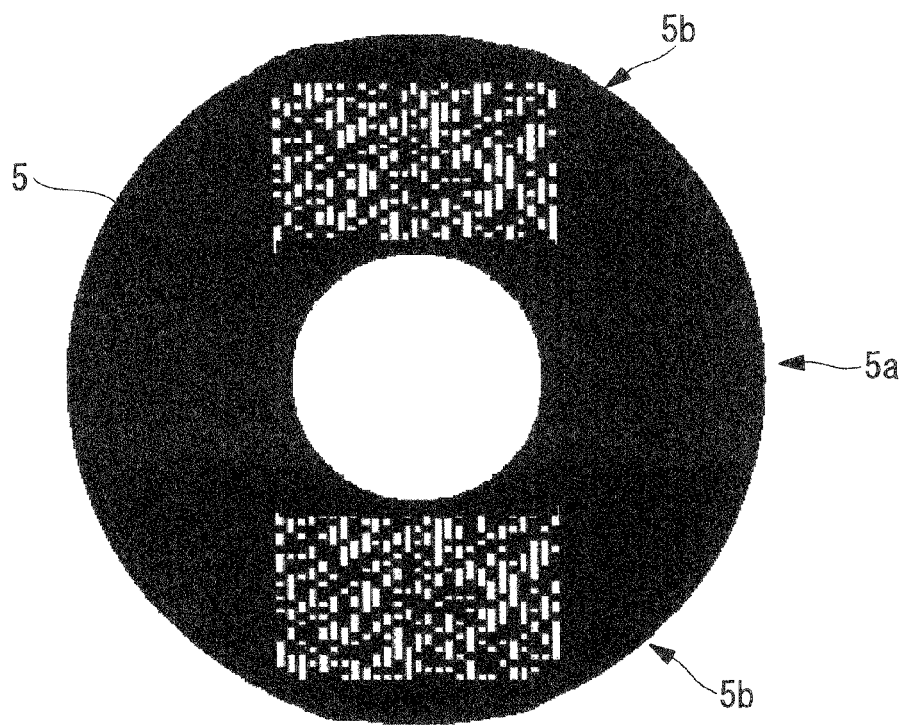
FIG. 2 is a diagram showing an example of an aperture member in the image-capturing apparatus in FIG. 1.

As shown in FIG. 2, the aperture member 5 includes a normal aperture portion 5a having a substantially circular opening which allows a portion of the light from the subject A, which is focused by the image-capturing lens 4, to pass therethrough and coded aperture portions 5b disposed at two positions flanking the normal aperture portion 5a.

The two coded aperture portions 5b have openings of the same shape, and the shape of those openings is an arbitrary prescribed pattern other than a simple circular shape, as shown in FIG. 2, for example.

The microlens array 6 is provided with a plurality of microlenses 6a two-dimensionally arrayed in two mutually orthogonal directions, at a position separated from the position of the real image B in the optical-axis direction, towards the image-capturing device 7. Thus, each microlens 6a in the microlens array 6 forms an image of the real image B at an image-capturing surface 7a of the image-capturing device 7.

The image-capturing device 7 is, for example, a CCD based on the RGB primary color system.

The image processing portion 3 includes an A/D converter 8 that converts the image information obtained by the image-capturing device 7 into a digital signal; a buffer 9 that temporarily stores the image information that has been converted to a digital signal; a selection portion 10 that distinguishes between and outputs image information of the light passing through the normal aperture portion 5a and image information of the light passing through the coded aperture portions 5b among the image information stored in the buffer 9; a signal processing portion 11 into which the image information of the light passing through the normal aperture portion 5a, which is selected by the selection portion 10, is input; a distance-information calculating portion 12 into which the image information of the light passing through the coded aperture portions 5b, which is selected by the selection portion 10, is input; and a combining portion 13 that associates the image signal output from the signal processing portion 11 and the distance information output from the distance-information calculating portion 12.

Reference sign 14 in the figure is an image-capturing control portion that controls the image-capturing lens 4, the aperture member 5, and the image-capturing device 7 on the basis of the image information stored in the buffer 9, reference sign 15 is a control portion that controls the image processing portion 3, and reference sign 16 is an I/F portion via which an external signal is input to the control portion 15.

Figure 3:
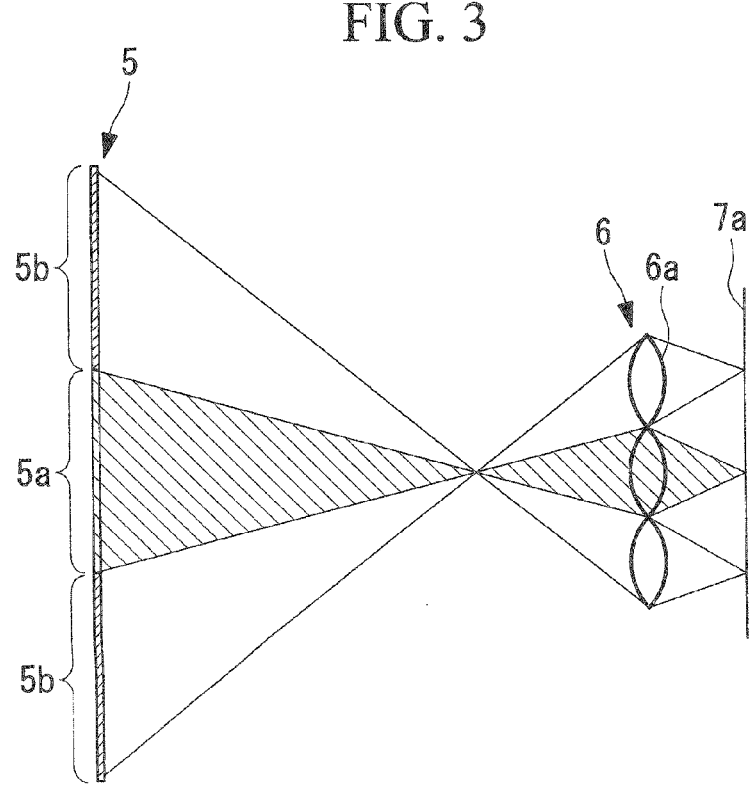
FIG. 3 is a diagram for explaining light rays from the aperture member to an image-capturing device, in the image-capturing apparatus in FIG. 1.

As shown in FIG. 3, the light rays (shaded portion) passing through the normal aperture portion 5a at the center of the aperture member 5 pass through the microlens 6a at the center and form an image on the image-capturing surface 7a of the image-capturing device 7. On the other hand, the light rays passing through the coded aperture portions 5b at the two positions flanking the normal aperture portion 5a pass through the microlenses 6a disposed at positions flanking the center microlens 6a and form images at different positions on the image-capturing surface 7a of the image-capturing device 7.

Since it is known in advance through which portion of the aperture member 5 the image information passes, according the image-forming position on the image-capturing device 7, the selection portion 10 conveys the image information of the light imaged on the image-capturing device 7 to either the signal processing portion 11 or the distance-information calculating portion 12 using the information regarding the position thereof on the image-capturing device 7.

The signal processing portion 11 performs known demosaicing processing and white-balance processing on the image information of the light passing through the normal aperture portion 5a, which is transferred from the selection portion 10, and generates RGB three-plane image signals for each pixel.

Figure 4:
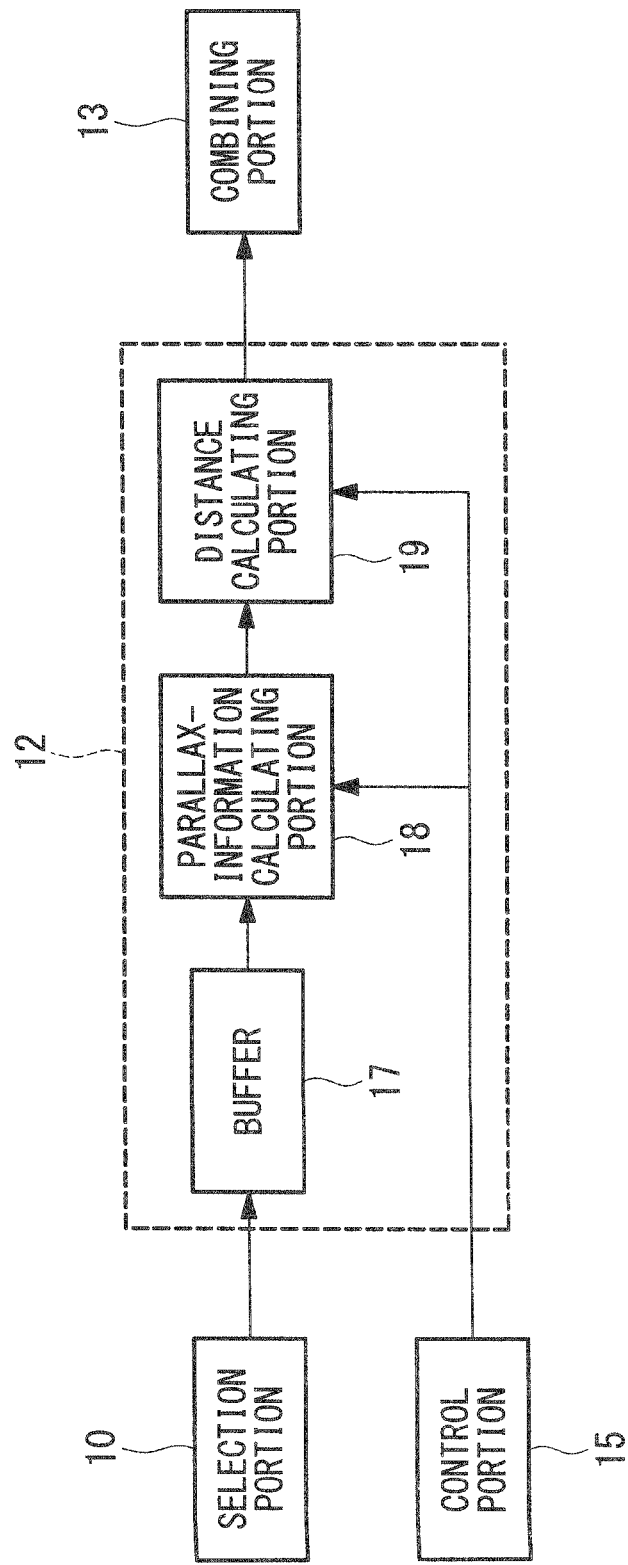
FIG. 4 is a block diagram showing a distance-information calculating portion in the image-capturing apparatus in FIG. 1.

On the other hand, as shown in FIG. 4, the distance-information calculating portion 12 includes a buffer 17 that stores the image information of the light passing through the coded aperture portions 5b, which is transferred from the selection portion 10, a parallax-information calculating portion 18 that calculates parallax information from the image information stored in the buffer 17, and a distance calculating portion 19 that calculates a distance to the subject on the basis of the parallax information calculated by the parallax-information calculating portion 18.

The parallax-information calculating portion 18 performs known matching processing on the two sets of image information of the light passing through the two coded aperture portions 5b shown in FIG. 2, and calculates the parallax information.

Since the image information stored in the buffer 17 is a single-plane signal, when performing the matching processing, a luminance signal of each pixel is extracted in advance.

For example, it suffices to extract only the G signal in the single-plane image information, or to remove the G signal after performing known demosaicing processing to convert the image to a three-plane signal.

In the distance calculating portion 19, if the focal length of the microlenses 6a is $f\mu$, and the diameter of the microlenses 6a is $\phi$, the base length in the matching processing is $2\phi$, and therefore, the distance z between the microlens array 6 and the real image B is calculated using Equation (1) below.

$$z = f\mu \times 2\phi/d \quad (1)$$

Here, d is the amount of parallax calculated by the matching processing.

When the image-forming magnification of the image-capturing lens 4 is M, the distance Z between the image-capturing lens 4 and the subject A is given by Equation (2) below.

$$Z = z/M \quad (2)$$

The combining portion 13 associates the image signal calculated in the signal processing portion 11 with the distance information calculated in the distance-information calculating portion 12. The associating performed in the combining portion 13 is carried out in the following way.

Specifically, in the case where the spatial resolutions of the image signal and the distance information are different, the spatial resolution of the distance information is converted via known bicubic interpolation to match the spatial resolution of the image signal. Accordingly, the distance information can be associated with each pixel of the image signal.

The operation of the thus-configured image-capturing apparatus 1 according to this embodiment will be described below.

To measure the distance Z between the subject A and the image-capturing lens 4 using the image-capturing apparatus 1 according to this embodiment, after setting image-capturing conditions, such as the ISO sensitivity, exposure, and so forth, via the I/F portion 16, a shutter button (not illustrated) is half pressed, thereby entering a pre-capture mode. The light from the subject A enters the image-capturing portion 2 via the image-capturing lens 4 and, after forming the real image B, is focused by the microlens array 6 and is captured by the image-capturing device 7.

The image information obtained by the image-capturing device 7 is sent to the image processing portion 3.

The image information sent to the image processing portion 3 is first converted to a digital signal in the A/D converter 8, is then temporarily stored in the buffer 9, and after this, is sent to the image-capturing control portion 14. The image-capturing control portion 14 controls a degree-of-opening adjusting motor 5c in the aperture member 5 using luminance levels in the image signal sent thereto and controls the electronic shutter speed in the image-capturing device 7. In addition, the image-capturing control portion 14 controls an AF motor 4a in the image-capturing lens 4, calculates a contrast value in a prescribed region from the image signal, and sets the image-capturing lens 4 to a prescribed focal length so that the contrast value is maximized.

By fully pressing the shutter button in this state, main image capturing is performed. The main image capturing is performed on the basis of the focal length and exposure conditions determined in the image-capturing control portion 14; the obtained image information is converted to a digital signal in the A/D converter 8, and after being stored in the buffer 9, is sent to the selection portion 10 and is sent to either the signal processing portion 11 or the distance-information calculating portion 12, for each pixel.

The image information from pixels at which the light passing through the normal aperture portion 5a in the aperture member 5 is imaged is sent from the selection portion 10 to the signal processing portion 11, where a two-dimensional image signal is generated.

On the other hand, the image information from pixels at which the light passing through the coded aperture portions 5b in the aperture member 5 is imaged is sent from the selection portion 10 to the distance-information calculating portion 12, where the distance information is calculated.

Then, the two-dimensional image signal output from the signal processing portion 11 and the distance information output from the distance-information calculating portion 12 are sent to the combining portion 13, where a two-dimensional image signal in which the distance information is associated with each pixel is generated.

In this case, with the image-capturing apparatus 1 according to this embodiment, since the distance information is calculated using the light that passes through the coded aperture portions 5b, the following advantages are provided.

Specifically, if the image-capturing lens 4 is assumed to be a telecentric optical system, the blur shape is known to be proportional to the shape of the openings in the aperture portions 5a and 5b.

Figure 5:
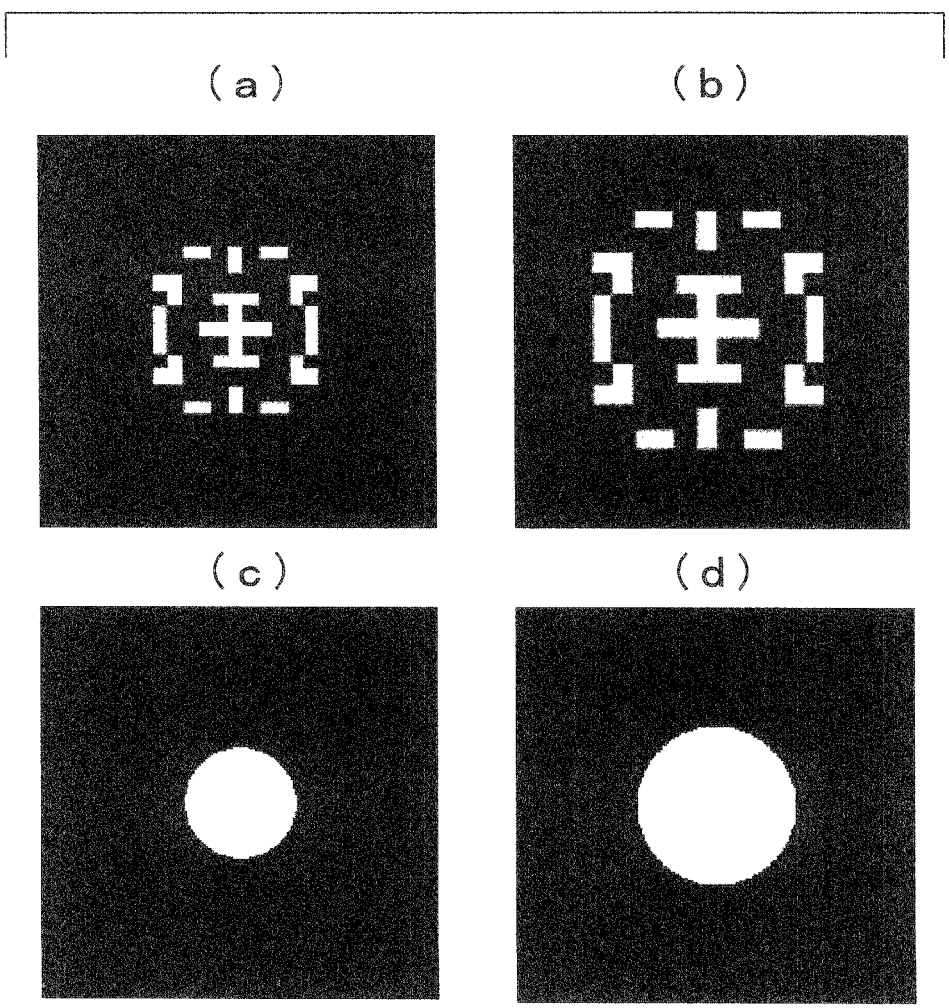
FIG. 5 shows images with different degrees of blurring, obtained by the image-capturing apparatus in FIG. 1, wherein (a) is an example image with a small amount of blurring, through a coded aperture portion, (b) is an example image with a large amount of blurring, through the coded aperture portion, (c) is an example image with a small amount of blurring, through a normal aperture portion, and (d) is an example image with a large amount of blurring, through the normal aperture portion.

In FIG. 5, it is shown that FIG. 5(b) is more blurred than FIG. 5(a), and FIG. 5(d) is more blurred than FIG. 5(c).

Figure 6:
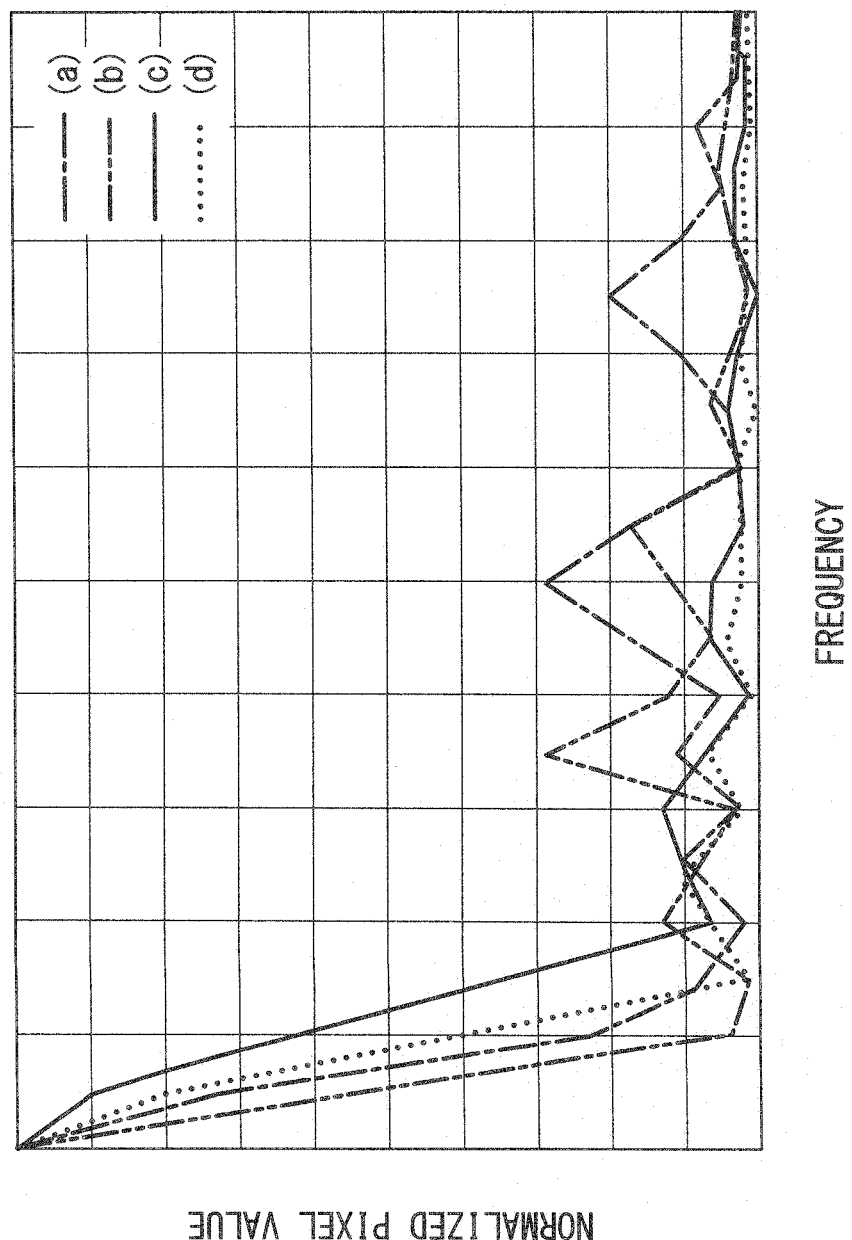
FIG. 6 is a diagram showing frequency characteristics corresponding to the example images (a) to (d) in FIG. 5.

When the shape of this blurring is Fourier-transformed, the results are as shown in FIG. 6. The horizontal axis in FIG. 6 indicates frequency, and the vertical axis indicates normalized pixel value.

FIG. 6 reveals that, in the frequency characteristics of FIG. 5(a) and FIG. 5(b), there are higher pixel values at high-frequency components compared with the frequency characteristics of FIG. 5(c) and FIG. 5(d).

In the matching processing, when there is little texture information, in other words, high-frequency component signals, in the image signal, the precision of the matching processing decreases, and the precision of the distance information decreases. As shown in FIGS. 5(a) and 5(b), the image information passing through the coded aperture portions 5b has higher high-frequency components compared with the image information passing through the normal aperture portion 5a, and therefore, the precision of the matching processing increases, and an advantage is afforded in that it is possible to calculate the distance information with improved precision.

In addition, even with the blurred image information like that shown in FIGS. 5(b) and (d), there are high-frequency components in the image information passing through the coded aperture portions 5b, shown in FIG. 5(b), and therefore, the precision of the matching processing can be maintained. In other words, an advantage is afforded in that the range in the depth direction over which the distance information can be measured is wider than that in the image information based on the light passing through the normal aperture portion 5a.

Although a telecentric optical system has been described here as an example, the same applies also to other types of optical systems.

Thus, with the image-capturing apparatus 1 according to this embodiment, an advantage is afforded in that it is possible to obtain a high-quality image signal with the image information obtained by capturing the light passing through the normal aperture portion 5a, and in addition, it is possible to obtain the distance Z to the subject A with superior precision using the image information obtained by capturing the light passing through the coded aperture portions 5b.

Figure 7:
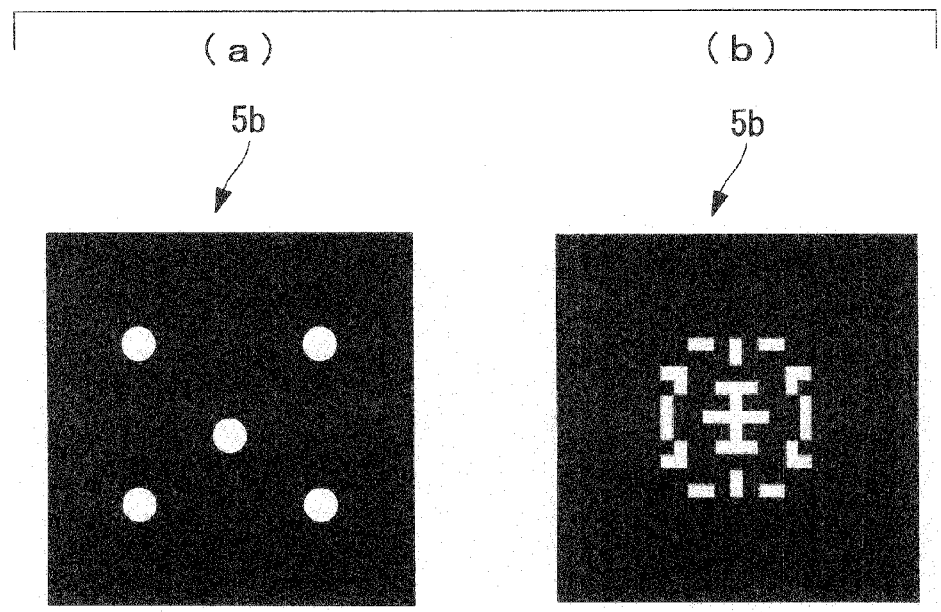
FIGS. 7(a) and (b) are diagrams showing modifications of the coded aperture portions in the aperture member in FIG. 2.

In the image-capturing apparatus 1 according to this embodiment, the aperture member 5 having the coded aperture portions 5b shown in FIG. 2 is employed; instead of this, however, it may have coded aperture portions 5b like those shown in FIGS. 7(a) and (b). In addition, although a case where the normal aperture portion 5a and the coded aperture portions 5b are each associated with a single microlens 6a has been given as an example, instead of this, as shown in FIG. 8, a microlens array 6 in which the normal aperture portion 5a and the coded aperture portions 5b are each associated with a plurality of (for example, two) microlenses 6a may be employed.

Figure 8:
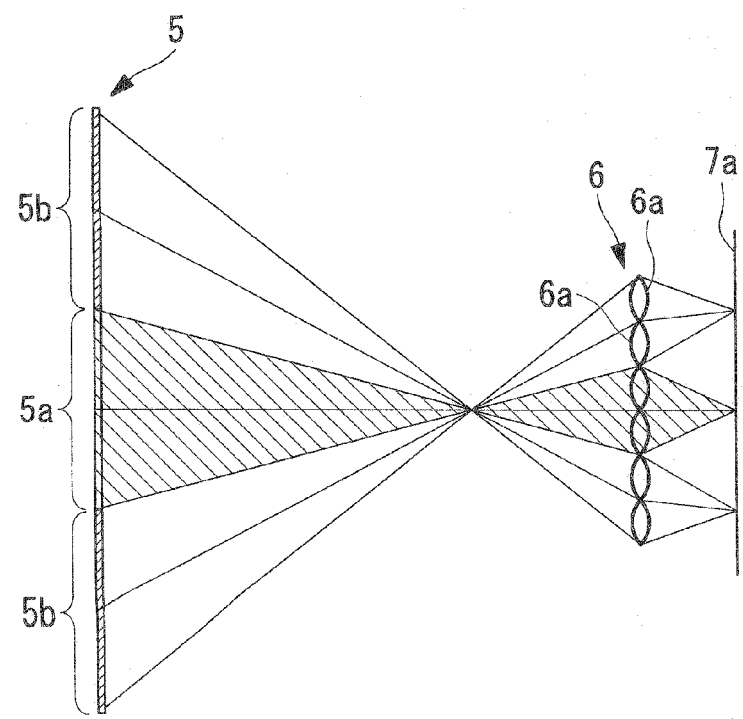
FIG. 8, which is a modification of the image-capturing apparatus in FIG. 1, is a diagram showing a case in which a plurality of microlenses respectively correspond to light passing through the individual aperture portions.

As in FIGS. 3 and 8, the number of microlenses is a multiple of the number of aperture portions, and in these cases, since the number of aperture portions is 3, the number of microlenses 6a is a multiple of 3. Similarly, in the two-dimensional case also, if the number of aperture portions 5a and 5b in one direction is x, and the number of aperture portions 5a and 5b in the other direction is y, the number of microlenses 6a in one direction, Nx, and the number of microlenses 6a in the other direction, Ny, are given by Equation (3) below.

$$Nx = i \times x, Ny = j \times y \quad (3)$$

Here, i and j are integers greater than or equal to 1.

Figure 9:
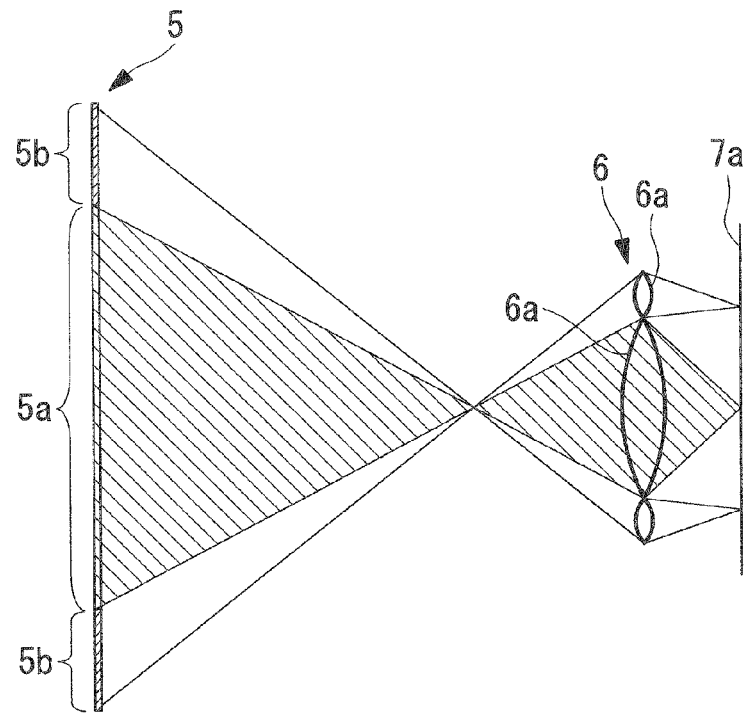
FIG. 9, which is another modification of the image-capturing apparatus in FIG. 1, is a diagram showing a case in which the microlens for the light passing through the normal aperture portion is larger than the microlenses for the light passing through the coded aperture portions.

In addition, the areas of the aperture portions 5a and 5b need not be all the same. As shown in FIG. 9, the areas of the aperture portions 5a and 5b, may be different.

In this case, the light passing through the large normal aperture portion 5a at the center passes through the large-diameter microlens 6a at the center and forms an image on the image-capturing surface 7a of the image-capturing device 7. On the other hand, the light passing through the coded aperture portions 5b, which are disposed at both sides so as to flank the normal aperture portion 5a and which have smaller areas than the normal aperture portion 5a, passes through the small microlenses 6a disposed so as to flank the microlens 6a at the center and forms an image at the image-capturing surface 7a of the image-capturing device 7.

By doing so, an advantage is afforded in that the spatial resolution of the image information obtained by capturing the light passing through the normal aperture portion 5a can be made higher than that of the image information obtained by capturing the light passing through the coded aperture portions 5b.

Figure 10:
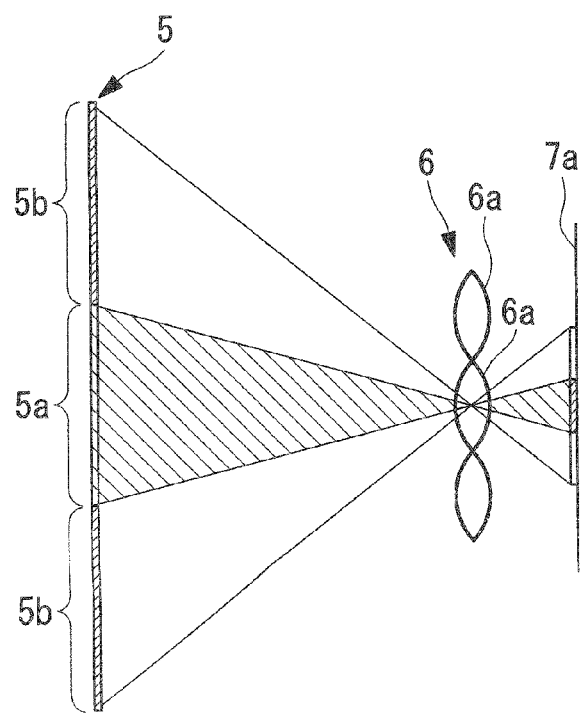
FIG. 10, which is another modification of the image-capturing apparatus in FIG. 1, is a diagram showing an apparatus in which the light beams passing through the aperture members are arrayed so as to form images at the microlens array.

As the image-capturing portion 2, as shown in FIG. 10, it is possible to consider an image-capturing portion in which the light focused by the image-capturing lens 4 forms an image on the microlens array 6. In this case, as shown in FIG. 10, the light passing through the normal aperture portion 5a at the center forms a real image at the center pixel of the image-capturing surface 7a of the image-capturing device 7.

That is to say, the light passing through the respective aperture portions 5a and 5b is imaged at the microlens array 6. In this case, by extracting the image information obtained at the center pixel of the three pixels for each microlens 6a, it is possible to obtain image information of the light passing through the normal aperture portion 5a, and by extracting the image information obtained at the two side pixels of the three pixels, it is possible to obtain image information of the light passing through the two coded aperture portions 5b.

Figure 11:
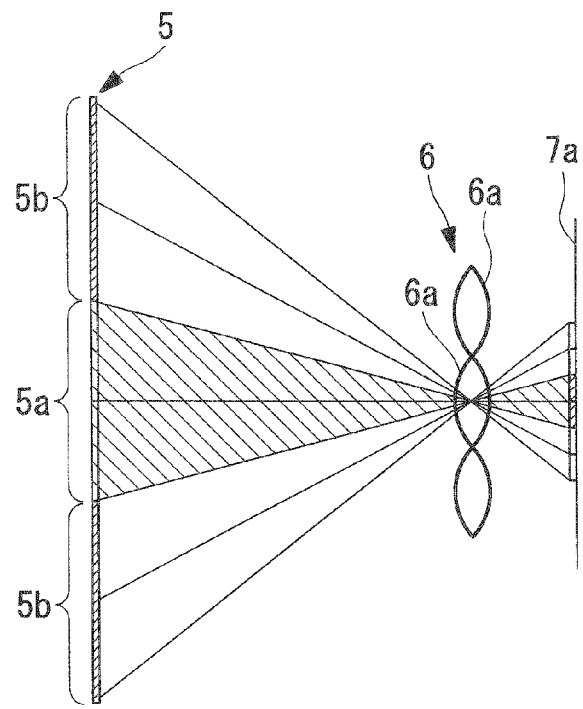
FIG. 11, which is a modification of the image-capturing apparatus in FIG. 10, is a diagram showing a case in which the light beams passing through the individual aperture portions are made incident on a plurality of pixels.

The number of pixels corresponding to a single microlens 6a need not be three. For example, as shown in FIG. 11, the number of corresponding pixels may be 6.

In the case of this image-capturing portion 2, the number of pixels corresponding to a single microlens 6a is a multiple of the number of aperture portions 5a and 5b. In this case, since there are three aperture portions 5a and 5b, the number of pixels is a multiple of 3.

Similarly, in the two-dimensional case also, if the number of aperture portions 5a and 5b in one direction is x, and the number of aperture portions 5a and 5b in the other direction is y, the number of pixels in one direction, Px, and the number of pixels in the other direction, Py, corresponding to a single microlens 6a are given by Equation (4) below.

$$Px = k \times x, Py \leq m \times y \quad (4)$$

Here, k and m are integers equal to or greater than 1.

Figure 12:
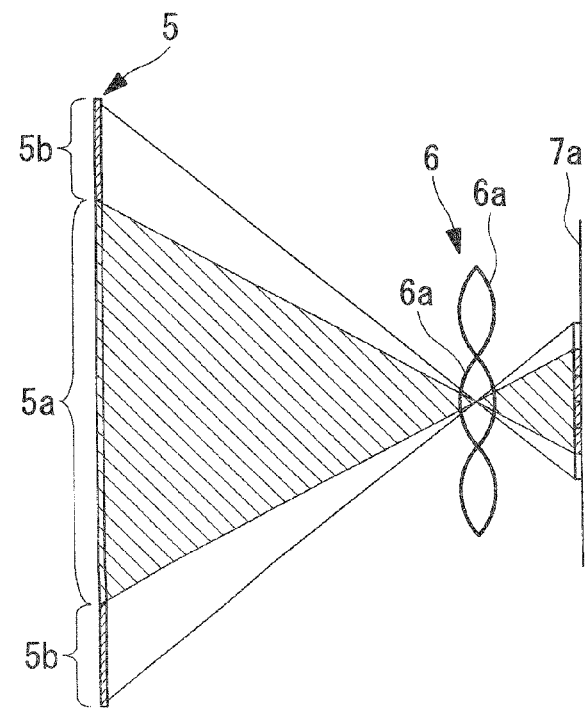
FIG. 12, which is another modification of the image-capturing apparatus in FIG. 10, is a diagram showing a case in which the number of pixels that receive the light passing through the normal aperture portion is higher than the number of pixels that receive the light passing through the coded aperture portions.

The areas of the aperture portions 5a and 5b need not be all the same. As shown in FIG. 12, the areas of the aperture portions 5a and 5b may be different.

In this case, the light passing through the large normal aperture portion 5a at the center forms an image on the microlens 6a and is incident on four pixels on the image-capturing surface 7a of the image-capturing device 7. On the other hand, the light passing through the coded aperture portions 5b, which are disposed at both sides so as to flank the normal aperture portion 5a and which have smaller areas than the normal aperture portion 5a, forms an image at the same microlens 6a and is then incident on single pixels at the periphery of the image-capturing surface 7a of the image-capturing device 7.

By doing so, an advantage is afforded in that the spatial resolution of the image information obtained by capturing the light passing through the normal aperture portion 5a can be made higher than that of the image information obtained by capturing the light passing through the coded aperture portions 5b.

Figure 13:
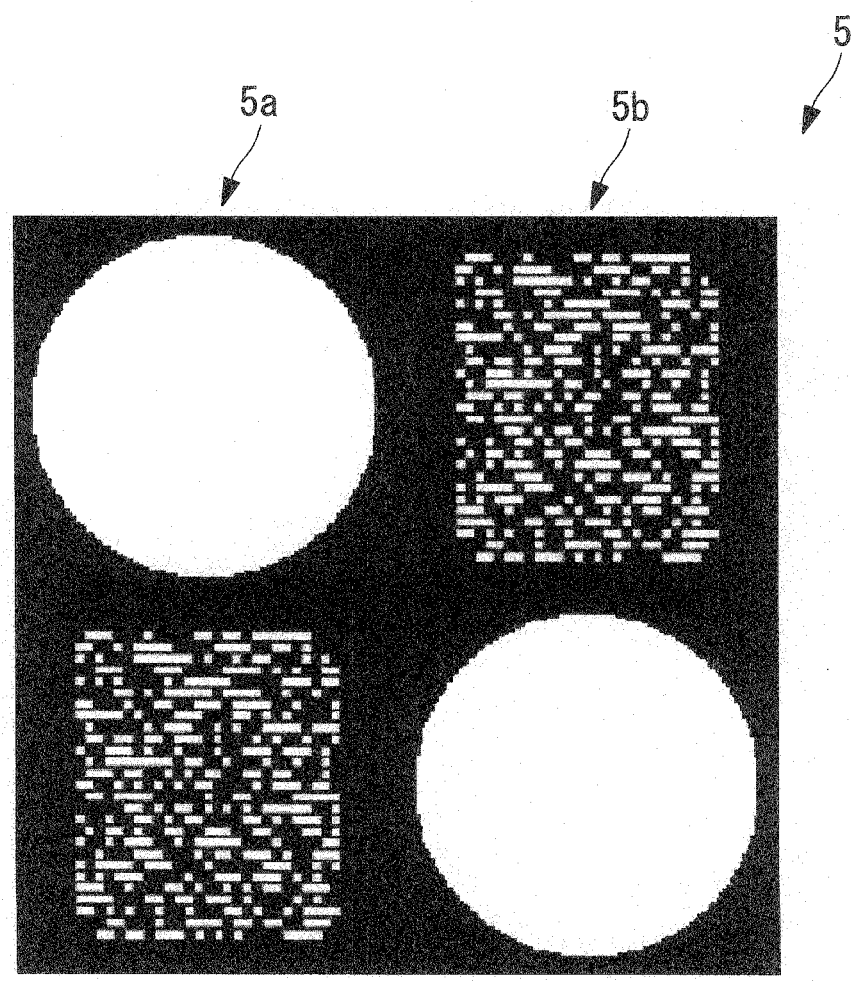
FIG. 13 is a diagram showing a modification of the aperture member in FIG. 2.

The arrangement of the aperture portions 5a and 5b need not include three aperture portions; as shown in FIG. 13, four or more aperture portions may be provided.

The above-described embodiment leads to the following inventions.

In one aspect of the present invention, there is provided an image-capturing apparatus including an image-capturing lens that focuses light from a subject; an aperture member disposed adjacent to the image-capturing lens; an image-capturing device that captures an image of the light focused by the image-capturing lens and passing through the aperture member; and a microlens array disposed between the image-capturing device and the image-capturing lens, with gaps therebetween in an optical-axis direction, wherein the aperture member includes at least one normal aperture portion having a substantially circular opening and at least two coded aperture portions having openings in a prescribed pattern.

With this aspect, when the light from the subject, which is focused by the image-capturing lens, is made to pass through the aperture member, it is made to pass through one of the normal aperture portion and the coded aperture portions. The light passing through the aperture portion is made to pass through the microlens array and is made incident on the image-capturing surface of the image-capturing device. The light that passes through the normal aperture portion, having a substantially circular opening, is made incident on the image-capturing surface, thereby making it possible to obtain a high-precision image. Also, the light that passes through the at least two coded aperture portions having openings in a prescribed pattern is made incident on the image-capturing surface, thereby making it possible to obtain image information having high-frequency components; in addition, the image information obtained by capturing the light focused by the microlens array has parallax, and by using this parallax information, it is possible to measure the distance to the subject with good precision.

The above-described aspect may further include a distance-information calculating portion that calculates distance information on the basis of image information obtained by capturing an image of the light passing through the coded aperture portions with the image-capturing device; an image generating portion that generates an image using the image information obtained by capturing an image of the light passing through the normal aperture portion with the image-capturing device; and a combining portion that associates the distance information calculated by the distance-information calculating portion with each pixel in the image generated by the image generating portion.

By doing so, since the distance to the subject is calculated with good precision by the distance-information calculating portion, it is possible to generate a high-quality image in which the distance to the subject is associated with each pixel of the image of the subject generated by the image generating portion.

In addition, in the above-described aspect, the normal aperture portion and the coded aperture portions may be arrayed along two mutually orthogonal directions, and when the total arrayed number of the normal aperture portions and the coded aperture portions in one direction is x, and the total arrayed number thereof in the other direction is y, the arrayed number of microlenses in the microlens array in one direction may be i×x, and the arrayed number thereof in the other direction may be j×y.

Here, i and j are integers equal to or greater than 1.

By doing so, it is possible to obtain image information having parallax in two mutually orthogonal directions, and it is possible to more precisely calculate the distance to the subject.

In the above-described aspect, the normal aperture portion and the coded aperture portions may be arrayed along two mutually orthogonal directions, and when the total arrayed number of the normal aperture portions and the coded aperture portions in one direction is x, and the total arrayed number thereof in the other direction is y, the number of pixels in the one direction on the image-capturing device, corresponding to each microlens in the microlens array, may be k×x, and the number of pixels in the other direction may be m×y.

Here, k and m are integers greater than or equal to 1.

By doing so, it is possible to obtain image information having parallax in two mutually orthogonal directions, and it is possible to more precisely calculate the distance to the subject.

In the above-described aspect, the distance-information calculating portion may calculate distance information using parallax information calculated by performing matching processing using two or more sets of image information obtained by the image-capturing device through the coded aperture portions disposed at different positions.

REFERENCE SIGNS LIST

A subject
1 image-capturing apparatus 4 image-capturing lens
5 aperture member
5a normal aperture portion
5b coded aperture portion
6 microlens array
6a microlens
7 image-capturing device
11 signal processing portion (image generating portion)
12 distance-information calculating portion
13 combining portion

The invention claimed is:

1. An image-capturing apparatus comprising:
   an image-capturing lens that focuses light from a subject;
   an aperture member disposed adjacent to the image-capturing lens;
   an image-capturing device that captures an image of the light focused by the image-capturing lens and passing through the aperture member; and
   a microlens array disposed between the image-capturing device and the image-capturing lens, with gaps therebetween in an optical-axis direction,
   wherein the aperture member includes at least one normal aperture portion having a substantially circular opening and at least two coded aperture portions having openings in a prescribed pattern.

2. An image-capturing apparatus according to claim 1, further comprising:
   a distance-information calculating portion that calculates distance information on the basis of image information obtained by capturing an image of the light passing through the coded aperture portions with the image-capturing device;
   an image generating portion that generates an image using the image information obtained by capturing an image of the light passing through the normal aperture portion with the image-capturing device; and
   a combining portion that associates the distance information calculated by the distance-information calculating portion with each pixel in the image generated by the image generating portion.

3. An image-capturing apparatus according to claim 1, wherein
   the normal aperture portion and the coded aperture portions are arrayed along two mutually orthogonal directions, and
   when the total arrayed number of the normal aperture portions and the coded aperture portions in one direction is x, and the total arrayed number thereof in the other direction is y,
   the arrayed number of microlenses in the microlens array in one direction is i×x, and the arrayed number thereof in the other direction is j×y, where i and j are integers greater than or equal to 1.

4. An image capturing apparatus according to claim 1, wherein
   the normal aperture portion and the coded aperture portions are arrayed along two mutually orthogonal directions, and
   when the total arrayed number of the normal aperture portions and the coded aperture portions in one direction is x, and the total arrayed number thereof in the other direction is y,
   the number of pixels in the one direction on the image-capturing device, corresponding to each microlens in the microlens array, is k×x, and the number of pixels in the other direction is m×y,
   where k and m are integers greater than or equal to 1.

5. An image-capturing apparatus according to claim 1, wherein the distance-information calculating portion calculates distance information using parallax information calculated by performing matching processing using two or more sets of image information obtained by the image-capturing device through the coded aperture portions disposed at different positions.

* * * * *